United States Patent Office 3,475,485
Patented Oct. 28, 1969

3,475,485
DIBENZOCYCLOHEPTENE-5-HYDROXAMIC ACID AND ETHER AND CARBONYL DERIVATIVES THEREOF
Martin A. Davis, Montreal, Quebec, Canada, assignor to American Home Products Corporation, New York, N.Y., a corporation of Delaware
No Drawing. Filed Feb. 8, 1967, Ser. No. 614,549
Int. Cl. C07c 83/08; A61k 27/00
U.S. Cl. 260—500.5
3 Claims

ABSTRACT OF THE DISCLOSURE

There are disclosed herein the compounds 10,11-dihydro-5H-dibenzo[a,d]cycloheptene-5-hydroxamic acid, the corresponding O-methyl, O-ethyl, O-propyl, O-butyl ethers thereof, and the corresponding acetyl, propionyl, butyryl, benzoyl, phenylacetyl, trimethoxybenzoyl esters, as well as, the 10,11-dihydro-5H-[a,d]cycloheptene - 5 - carbonyl derivatives thereof. The above compounds have trichomonicidal and antifungal activities, and methods for their preparation and use are also given.

This invention relates to a novel chemical compounds having useful biological properties. More particularly, this invention relates to 10,11-dihydro-5H-dibenzo[a,d]cycloheptene-5-hydroxamic acids of the following formula

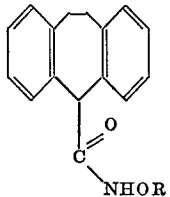

in which R represents hydrogen or a lower alkyl group containing from 1 to 4 carbon atoms, or a lower aliphatic acyl group containing from 2 to 4 carbon atoms, an aroyl group containing from 7 to 10 carbon atoms, or the 10,11-dihydro-5H-dibenzo[a,d]cycloheptene-5-carbonyl group.

The compounds of this invention may be prepared by the following procedure: A solution of 10,11-dihydro-5H-dibenzo[a,d]cycloheptene-5-carbonyl chloride (prepared as described by M. A. Davis et al. in J. Med. Chem., 6, 250 (1963)), in an inert solvent such as, for example, benzene, is added to a stirred suspension of hydroxylamine hydrochloride, sodium carbonate, and water. After completion of the reaction, the desired product is collected in the conventional manner and purified by recrystallization from an appropriate solvent. In the same manner, but using alkoxyamines instead of hydroxylamine the corresponding compounds of formula in which R represents a lower alkyl group are obtained.

The compounds of the general formula in which R represents hydrogen may furthermore be acylated by conventional acylation procedures, and in this manner the corresponding acylated derivatives of the compounds of the general formula in which R represents a lower aliphatic acyl group containing from 2 to 4 carbon atoms, an aroyl group containing from 7 to 10 carbon atoms, or the 10,11-dihydro-5H-dibenzo[a,d]cyclohepten - 5 - carbonyl group are obtained.

The compounds of this invention have useful biological properties and are of value as medicaments. In mammals, at doses well below those causing toxic manifestations, they inhibit the convulsion caused by experimental electroshock and are useful as anti-convulsant agents. For this purpose, they may be administered in the form of dry powder capsules, compressed tablets or as suspensions in an aqueous vehicle, containing from 100 to 400 mg. of the active ingredient per unit dosage form. Such forms may be administered from twice to five times daily. The novel compounds further have activity against *Trichomonas vaginalis* and are trichomonacidal agents. For this purpose, they may be formulated with suitable excipients as vaginal inserts or vaginal suppositories each containing from 50–500 mg. of the active ingredient. Said forms may be administered twice or thrice daily for periods of time of from 2 to 4 weeks. In addition to the above-mentioned desirable biological properties, the compounds have activity against certain pathogenic fungi, in particular, *Microsporum gypseum* and *Trichophyton granulosum* are anti-fungal agents. As such, they may be formulated with suitable excipients in the form of lotions, ointments, or creams containing from 0.1–1 percent of the active ingredient and may be applied to the skin as required.

The following formulae and descriptive examples will illustrate my invention:

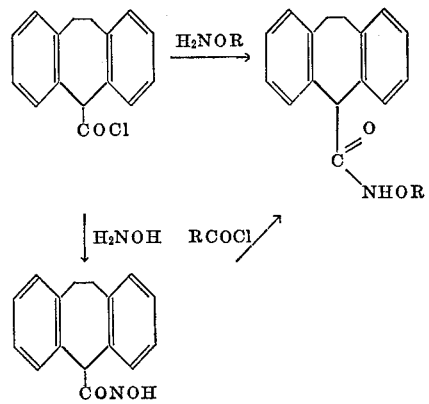

EXAMPLE 1

10,11-dihydro-5H-dibenzo[a,d]cycloheptene-5-hydroxamic acid

A solution of 10,11-dihydro-5H-dibenzo[a,d]cycloheptene-5-carbonyl chloride (9.0 g.) in benzene (50 ml.) is added with good stirring to a mixture of hydroxylamine hydrochloride (12.3 g.), sodium carbonate (19.2 g.), and water (10 ml.), in benzene (100 ml.). The reaction mixture is stirred for two hours and then filtered. The solid material is stirred with warm water followed by ether and is dried. There is thus formed 6.0 g. of the crude title product which is recrystallized from a mixture of isopropyl acetate and ethanol. The purified sample thus obtained has M.P. 190–191° C. and furnishes a positive hydroxamic test with aqueous ferric chloride solution. Elemental analysis confirms the empirical formula $C_{16}H_{15}NO_2$.

In the same manner, but using the hydrohalide salts of methoxyamine, ethoxyamine, propoxyamine or butoxyamine instead of hydroxyamine hydrochloride, the corresponding O-methyl, O-ethyl, O-propyl, and O-butyl ethers of 10,11-dihydro-5H-dibenzo[a,d]cycloheptene-5-hydroxamic acid are also obtained.

EXAMPLE 2

When a molar excess of 10,11-dihydro-5H-dibenzo[a,d]cycloheptene-5-carbonyl chloride is used in the reaction described in Example 1, the isolated product has M.P. 175–176° C. upon recrystallization from methanol and gives a negative hydroxamic acid test. Elemental analysis confirms the empirical formula $C_{32}H_{27}NO_3$, and its structure is shown by infrared and ultraviolet spectral data, to be the compound N-O-bis(10,11-dihydro-5H-dibenzo[a,d]cycloheptene-5-carbonyl)hydroxylamine.

Similarly, when acylating 10,11-dihydro-5H-dibenzo[a,d]cycloheptene-5-hydroxamic acid with a lower aliphatic acyl halide containing from 2 to 4 carbon atoms, such as, for example acetyl chloride, propionyl chloride, or butyryl chloride, or with aroyl halide containing from 7 to 10 carbon atoms, such as, for example, benzoyl chloride, phenylacetyl chloride, or trimethoxybenzoyl chloride, the corresponding acetyl, propionyl, butyryl, benzoyl, phenylacetyl, or trimethoxybenzoyl esters of 10,11 - dihydro-5H-dibenzo[a,d]cycloheptene-5-hydroxamic acid are also obtained.

I claim:
1. A compound of the formula

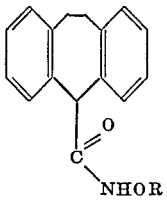

where R is selected from the group consisting of hydrogen, lower alkyl containing from 1 to 4 carbon atoms, acetyl, propionyl, butyryl, benzoyl, phenacetyl, trimethoxybenzoyl and the 10,11-dihydro-5H-dibenzo[a,d]cycloheptene-5-carbonyl group.

2. 10,11-dihydro - 5H - dibenzo[a,d]cycloheptene-5-hydroxamic acid.

3. N-O-bis(10,11-dihydro - 5H - dibenzo[a,d]cycloheptene-5-carbonyl)hydroxylamine.

References Cited
UNITED STATES PATENTS

| | | |
|---|---|---|
| 3,072,701 | 1/1963 | Wright et al. _____ 260—453 |
| 3,168,561 | 2/1965 | Richter et al. _____ 260—453 |
| 3,187,041 | 6/1965 | Richter et al. |
| 3,236,871 | 2/1966 | Hinman et al. _____ 260—453 |
| 3,371,106 | 2/1968 | Berliner et al. ____ 260—545 X |
| 3,242,212 | 3/1966 | Davis et al. |

CHARLES B. PARKER, Primary Examiner

S. T. LAWRENCE III, Assistant Examiner

U.S. Cl. X.R.

260—453, 544, 545; 424—298, 315